United States Patent [19]
Satoh et al.

[11] Patent Number: 5,374,970
[45] Date of Patent: Dec. 20, 1994

[54] WATERDROP-PROOF CAMERA

[75] Inventors: Kazuhiro Satoh, Sagamihara; Tatsuya Suzuki, Tokyo; Hiroshi Akitake, Sagamihara; Moriya Katagiri, Hachioji, all of Japan

[73] Assignee: Olympus Optical Co., Ltd., Tokyo, Japan

[21] Appl. No.: 969,402

[22] Filed: Oct. 30, 1992

[30] Foreign Application Priority Data

Dec. 26, 1991 [JP] Japan .................. 3-345544

[51] Int. Cl.$^5$ .................................................. G03B 17/08
[52] U.S. Cl. .................................................. 354/64
[58] Field of Search ................................ 354/64

[56] References Cited

U.S. PATENT DOCUMENTS

| | | | |
|---|---|---|---|
| 4,613,544 | 9/1986 | Burleigh | 428/315.5 |
| 4,668,061 | 5/1987 | Tamamura et al. | 354/64 |
| 4,803,504 | 2/1989 | Maeno et al. | 354/64 |
| 4,931,816 | 6/1990 | Kamo et al. | 354/64 |
| 4,963,902 | 10/1990 | Fukahori | 354/64 |
| 4,994,829 | 2/1991 | Tsukamoto | 354/64 |
| 5,056,903 | 10/1991 | Nakamura et al. | 354/64 |
| 5,066,965 | 11/1991 | Tanaka et al. | 354/64 |
| 5,070,348 | 12/1991 | Hayakawa et al. | 354/64 |
| 5,077,567 | 12/1991 | Haraguchi et al. | 354/64 |
| 5,153,622 | 10/1992 | Hayakawa et al. | 354/64 |
| 5,177,515 | 1/1993 | Tsukamoto | 354/64 |
| 5,200,775 | 4/1993 | Yokota | 354/64 |
| 5,209,965 | 5/1993 | Caldwell | 428/260 |
| 5,212,509 | 5/1993 | Kosako et al. | 354/64 |
| 5,217,782 | 6/1993 | Moretz et al. | 428/91 |

FOREIGN PATENT DOCUMENTS

| | | |
|---|---|---|
| 3112875 | 4/1982 | Germany . |
| 63-113137 | 3/1988 | Japan . |
| 1302241 | 12/1989 | Japan . |

Primary Examiner—Michael L. Gellner
Assistant Examiner—Nicholas J. Tuccillo
Attorney, Agent, or Firm—Louis Weinstein

[57] ABSTRACT

A waterdrop-proof camera includes lens frames which are moved backward and forward relative to an optical axis during zooming or focusing; a camera main body in which the lens frames are slidably held in a liquid-sealed state; vent holes, provided in positions where they will not be covered by the hand of a user, on either the wall surface of the camera main body or that of the lena frames, through which vent holes the inside of the camera is communicated with the outside thereof; and a sheet-like member, having sufficient water repellency and air permeability, arranged on the camera body containing the inner side of the vent holes so as to seal them. A sealing member formed from a elastic member is fixed to either one of first and second lens frames which move relative to each other, by which sealing member one of the lens frames is radially pressed against the other, so that a section between the two lens frames is waterproofed. In addition, a device is disposed for increasing the amount of pressure at a specific focal distance or in a state in which the lens frames are housed.

15 Claims, 4 Drawing Sheets

WATERDROP-PROOF CAMERA

BACKGROUND OF THE INVENTION

1. Field of the Invention

The present invention relates to a waterdrop-proof camera and, more particularly, to a waterdrop-proof camera being waterproof enough to enable it to be used even in a rainfall.

2. Description of the Related Art

When a zoom lens barrel is moved backward and forward during zooming or the like, the internal pressure of the camera changes. Therefore, for camera with zoom lenses to be waterproof, it must be constructed so as to absorb such a changes in the internal pressure of the camera. A camera constructed in the above way has already been disclosed for example, U.S. Pat. No. 4,931,816 or Japanese Laid-Open Utility Model Application Sho/63-113137.

The camera disclosed in U.S. Pat. No. 4,931,816 has an air circulation passage which enables the inside of the camera to communicate with the outside thereof, the inside of which passage has a water-repellent fine porous member arranged therein. Thus, air is circulated through the passage by means of the water-repellent fine porous member, thus preventing water from passing through the passage. This camera is a complete waterproof camera which prevents water immersion and it is pre-supposed that special members known by the trade names of "Gore-Tex" by Japan Gore-Tex Inc., "Entrant" by Toray Industries, Inc., Japan, "Micro-Tex" by Nitto Denko Co., Ltd., Japan, are used for the water-repellent fine porous member.

The camera disclosed in Japanese Laid-Open Utility Model Application Sho/63-113137, unlike that of U.S. Pat. No. 4,931,816, is a waterproof camera which can be used in daily life, that is, a waterdrop-proof camera waterproof enough to enable it to be used even in a rainfall. However, the construction thereof is substantially the same as that of U.S. Pat. No. 4,931,816. A member for sealing up vent holes comprises a filter which is not water permeable and is air permeable and formed of a porous ethylene tetrafluoride resin known by the trade name of "Gore-Tex".

In the above-described waterproof and waterdrop-proof technology of the prior art, making the camera waterproof of and adjusting the change in the atmospheric pressure, between the inside and the outside of the camera are performed by a member having a great number of holes whose respective diameters are smaller than those of water droplets (100 μm to 300 μm) and larger than water vapor (0.0004 μm).

Such members can be made considerably waterproof, but they are not very air permeable. Therefore, when such members are used for the purpose of making a camera waterproof and air permeable, it takes a sufficient amount of time to adjust the difference between the atmospheric pressure of the the inside and that of the outside of the camera. That is, a zooming operation must be performed quite slowly. In addition, a zooming load increases because of insufficient air permeability, causing a great amount of load on a motor for performing zooming and a speed-reduction gear system. As a consequence, a powerful zooming motor and a strong gear and gear shafts are required. As a result, problems arise, for example, costs increase, and a large construction is required, and thus miniaturization of camera is hindered.

However, the above-mentioned waterproof and air permeable member has a problem in that since it is provided with fine holes, if a user touches it inadvertently, it may be clogged, thus deteriorating the air permeability. Therefore, such member must be arranged in a place in camera where usually a user cannot touch the member when holding the camera, causing drawbacks, for example, design possibilities are limited and costs are high because of the specialized nature of the member.

SUMMARY OF THE INVENTION

An object of the present invention is to provide a waterdrop-proof camera which solves the above-mentioned problems of the prior art, which is not the water-immersion prevention type, but the waterproof type which can be used in daily life, is simple in construction, and is capable of being manufactured at a low cost.

According to the present invention, a communication passage for enabling the inside of the camera to communicate with the outside thereof is disposed in a position which is usually not covered by hand when the camera is held, and this communication passage is sealed by a sheet-like member formed from a cloth of polyester or the like, which is readily available and on which a water repellency treatment has been performed, so that this passage is water repellent and air permeable. As a result, complete waterdrop-proofness can be exhibited during use, for instance, in a rainfall. In addition, as readily available water repellent and air permeable members are used, costs can be reduced considerably.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENT

Figure 1:
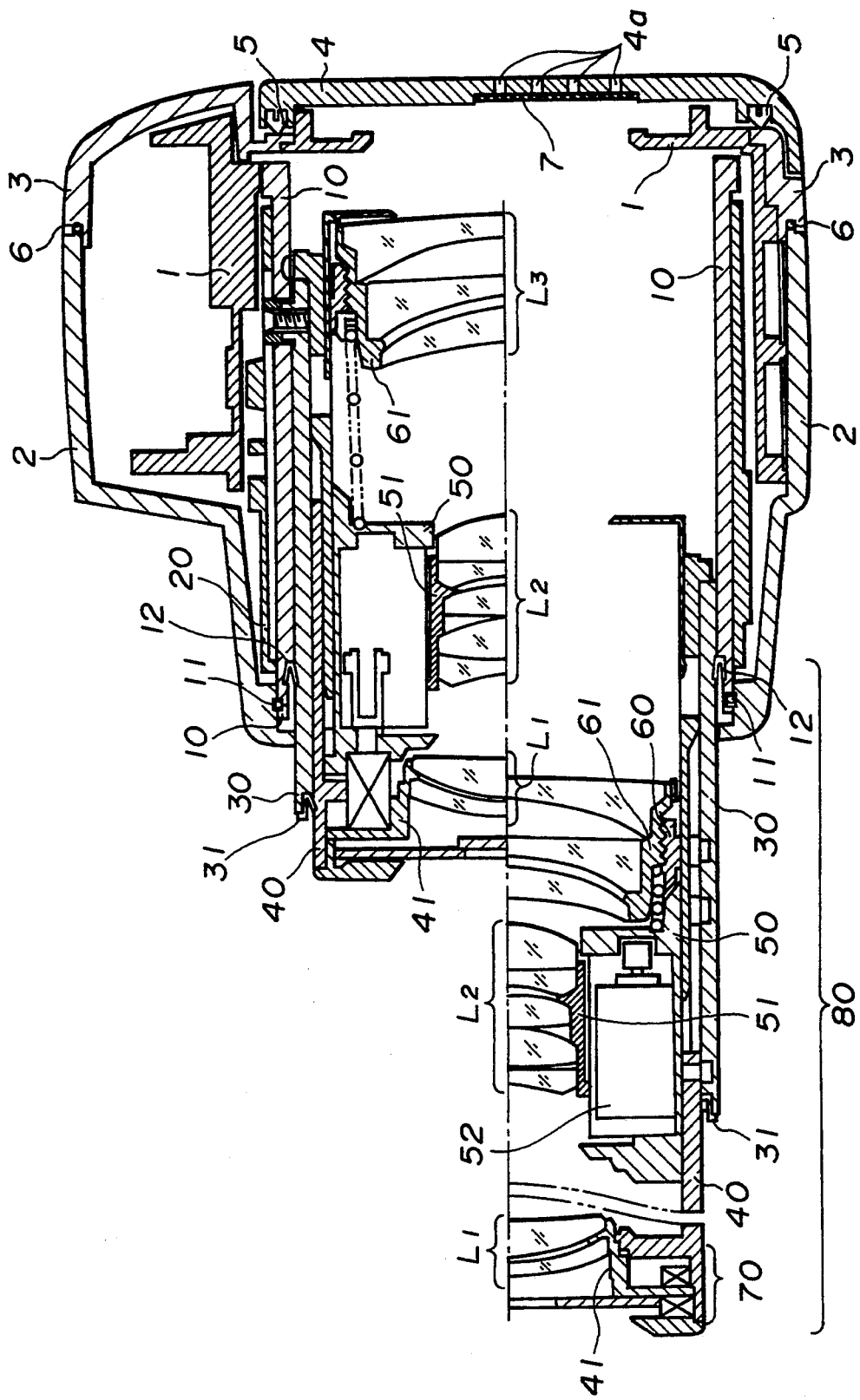
FIG. 1 is an enlarged sectional view illustrating an essential portion of a waterdrop-proof camera according to an embodiment of the present invention.

An embodiment of the present invention will be explained below with reference to FIG. 1.

A waterdrop-proof camera of this embodiment has a zoom lens barrel 80 which has a fixed frame 10 integrally mounted on a camera main body 1. The upper half portion of FIG. 1 illustrates a state in which a zoom lens which is a photographic optical system is moved to a wide angle position; the lower half portion of FIG. 1 illustrates a state in which the zoom lens is moved to a telephoto position. When the lens barrel 80 is housed, it is housed in a portion closer to the camera main body 1 than it is when in the wide angle position.

This waterdrop-proof camera comprises, as its main portions, the lens barrel 80, a front cover 2 with which the front portion of the camera main body 1 is covered, a back cover 3 with which the back portion of the camera main body 1 is covered, and a rear lid 4. The lens barrel 80 comprises, as its main portions, a drive frame 20 rotatably engaged with the outer peripheral surface of the fixed frame 10; a cam barrel 30 formed of a first mirror frame, which cam barrel is rotatably engaged with the inner peripheral surface of the fixed frame 10 and is moved backward and forward in the direction of the optical axis while the cam barrel is being rotated by the drive frame 20; a first lens frame 40 for holding a first lens holding frame 41 by which a first lens group L1 is held (the first lens frame forms a second mirror frame in the present invention); a second lens frame 50 for holding a second lens holding frame 51 by which a second lens group L2 is held; a third lens frame 60 for holding a third lens holding frame 61 by which a third lens group L3 is held; a barrier unit 70 held on the first lens frame 40; and a shutter unit 52 held on the second lens frame 50.

Figure 8:
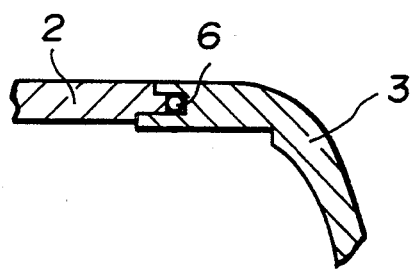
FIG. 8 is an enlarged sectional view of an essential portion of the waterdrop-proof camera illustrating a state in which a front cover is bonded to a back cover.

A light shielding rubber 5 formed of synthetic rubber or the like is fixed to the inner peripheral surface of the rear lid 4 on the entire circumference thereof, the lid being mounted on the back cover 3 in such a manner as to be opened and closed. When the rear lid 4 is closed, it is pressed in a section between the rear lid 4 and the back cover 3, thus preventing entry of light and water droplets from outside. A watertight rubber packing 6 (see FIG. 8) formed of silicon rubber or the like is fixed between the front cover 2 and the back cover 3 on the entire circumference of both thereof, thus preventing entry of light and water droplets from between the front cover 2 and the back cover 3. Furthermore, an O ring 11 formed of silicon rubber or the like is fitted to the portion where the inner peripheral surface of the front cover 2 toward the front end portion thereof is engaged with the extreme end portion of the fixed frame 10.

In addition, a sealing member 12 formed of silicon rubber or the like is mounted on the inner peripheral surface of the fixed frame 10 toward the extreme end portion thereof. A sealing member 31 formed of silicon rubber or the like is also mounted on the inner peripheral surface of the cam barrel 30 toward the extreme end portion thereof. A fluorine type water-repellent coating is applied on the outer peripheral surface of the cam barrel 30 and on the outer peripheral surface of the first lens frame 40. Therefore, a liquid sealing property and light sealing property for preventing the entry of light and water droplets among the fixed frame 10, the cam barrel 30 and the first lens frame 40 can be maintained by the above-mentioned water-repellent coating and the two sealing members 12 and 31.

The front lens of the first lens group L1 held on the first lens holding frame 41 is fixed to the first lens holding frame 41 by a bonding agent. This bonding agent also seals the section between the first lens holding frame 41 and the lens, thus preventing the entry of water droplets from the front side of the lens.

Figure 3:
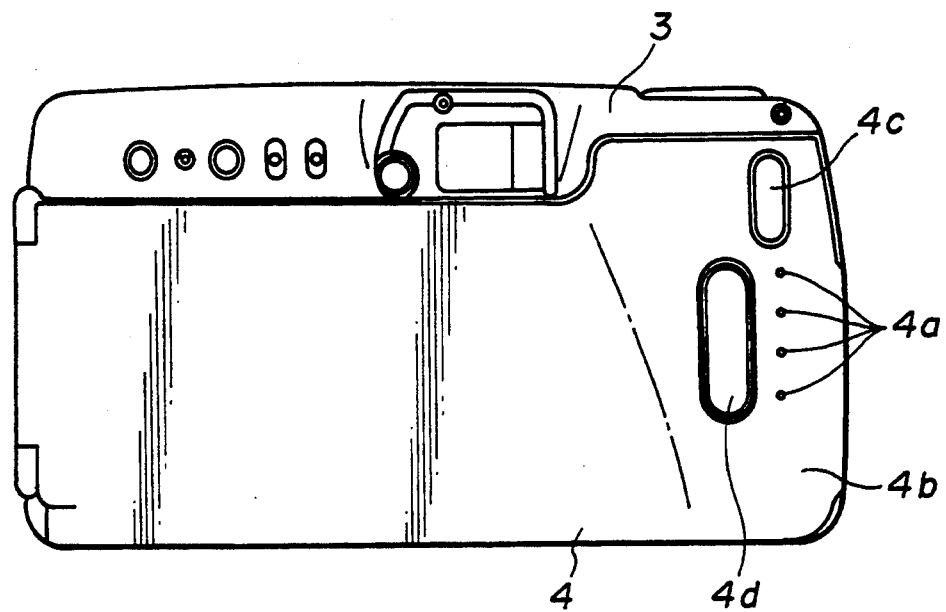
FIG. 3 is a rear view of the waterdrop-proof camera shown in FIG. 1.
Figure 9:
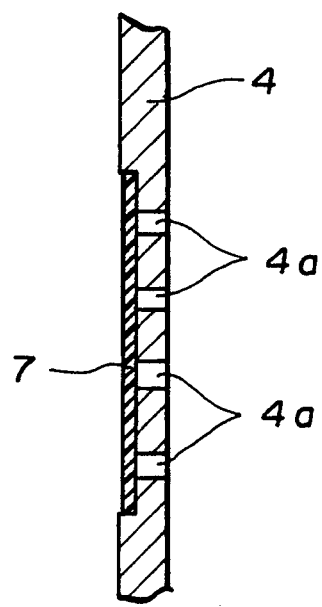
FIG. 9 is an enlarged sectional view of an essential portion of vent holes and a sheet-like member.

A plurality of vent holes 4a are provided in the rear lid 4, as is also shown in FIG. 9. A sheet-like water-repellent and air-permeable member 7 is fixed by a bonding agent to the inner surface of the camera main body, corresponding to the vent holes 4a, i.e., on the inner wall portion of the camera main body. As shown in the rear view of FIG. 3, the vent holes 4a are provided in a grip portion 4b on the back portion of the rear lid 4. A projected portion 4c in which a finger can be hooked is provided and extends outwardly in the upper portion of the grip portion 4b. A cartridge confirmation window 4d for confirming the presence of a film cartridge is provided in the central portion of the rear lid 4 toward the inner portion thereof. Four vent holes 4a are provided at equal intervals in a longitudinal direction in positions below the projected portion 4c and on the outer side of the cartridge confirmation window 4d.

Figure 2:
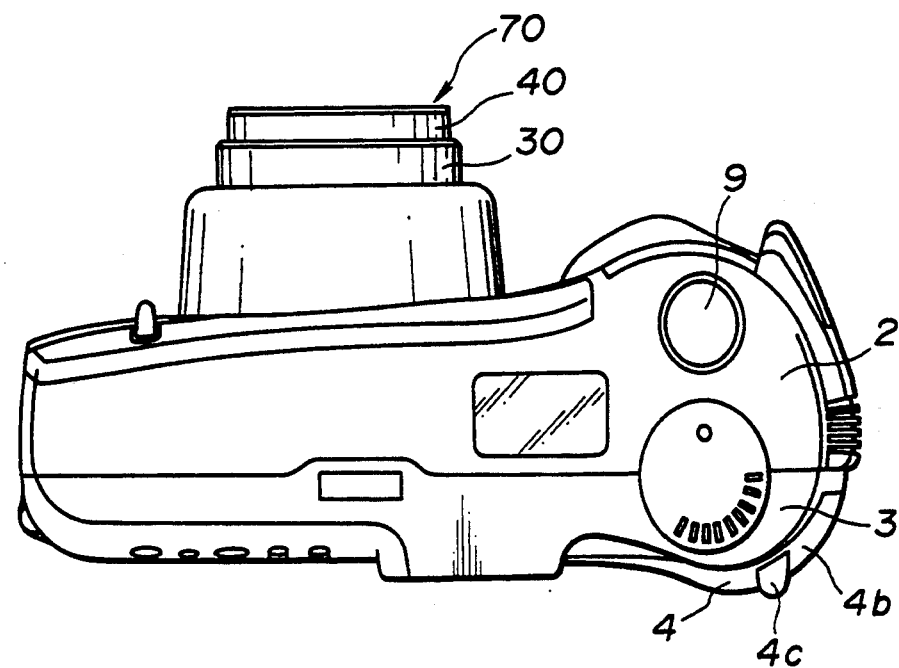
FIG. 2 is a top plan view of the waterdrop-proof camera shown in FIG. 1.

FIG. 2 is a top plan view of the waterdrop-proof camera shown in FIG. 1. A release button 9 is provided in the upper, right portion of the front cover 2 toward the front of the camera. The grip portion 4b is formed in such a manner as to project backward a little in an outer side corresponding to the release button 9.

Figure 4:
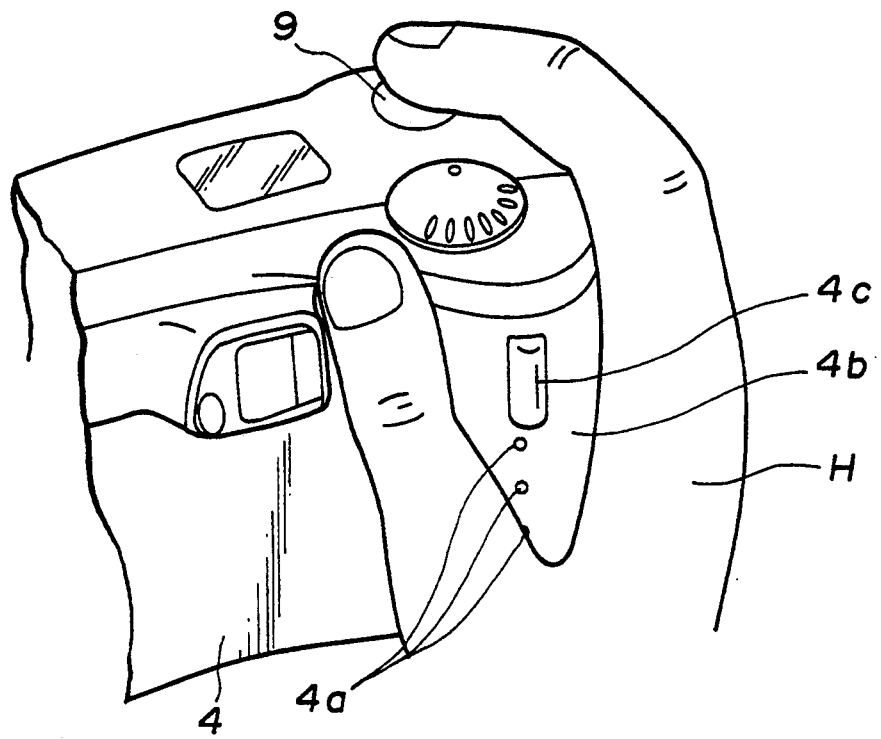
FIG. 4 is a perspective view of an essential portion of the waterdrop-proof camera illustrating a state in which the grip of the waterdrop-proof camera shown in FIG. 1 is held.
Figure 5:
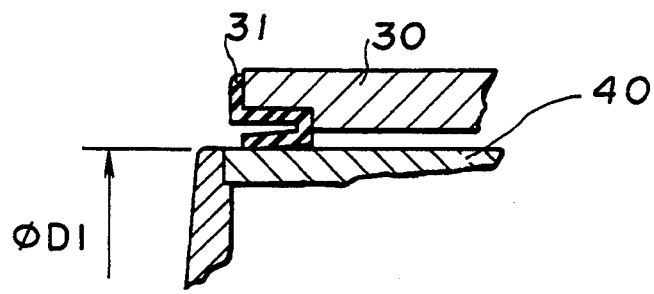
FIG. 5 is an enlarged sectional view of an essential portion of the waterdrop-proof camera illustrating a state in which a first lens frame is sealed to a cam barrel by a sealing member.

The vent holes 4a formed in the grip portion 4b in the rear lid 4 will usually not be covered by a hand H of a person when the camera is held as shown in FIG. 4.

The sheet-like member 7 is made by immersing a cloth woven with polyester fibers or a nylon material in a silicon or fluorine water repellant and drying it. There are usually spaces between the fibers in the sheet-like member 7. Each space is such a size that water droplets enter or sink into it unless water repellency treatment is performed.

Since the sheet-like member 7 is formed from a woven cloth on which water repellency treatment has been performed, even if many water droplets are applied onto the member 7, individual water droplets collect and become water droplets larger than the mesh of the cloth. Thus, the sheet-like member 7 can prevent such large water droplets from passing therethrough. The material described above is a very ordinary one, for example, one which is used as a material for a coat.

The waterdrop-proof camera of the present invention is constructed in the above-described way.

Next, the operation of the waterdrop-proof camera will be explained.

When the camera is zoomed from a wide-angle position shown in the upper half portion shown of FIG. 1 to a telephoto position in the lower half portion thereof, the volume of the inside of the camera changes considerably. Therefore, when the entire unit is hermetically sealed, the camera cannot be zoomed. However, in the waterdrop-proof camera of the present invention, since the vent holes 4a are provided in the rear lid 4, as previously mentioned, air is circulated through the air permeable sheet-like member 7. Therefore, the camera can be zoomed smoothly during ordinary use.

The cam barrel 30 formed of the first lens frame and the first lens frame 40 formed of the second lens frame in the lens barrel are controlled by lens barrel driving means to such a degree that the speed thereof does not exceed the water repellent capability of the sheet-like member 7 during zooming and focusing.

When this camera is used in a rainfall, it is waterproofed as described below:

(A) When raindrops or the like are applied onto the outer peripheral surface of the lens frame, entry of water droplets into the camera is prevented by the O ring 11, and the sealing members 12 and 31.

(B) When water droplets are applied onto the front side of the lens, entry of water droplets into the camera is prevented by the bonding agent between the first lens holding frame 41 and the first lens group L1.

(C) When water droplets are applied onto the abutment connection portion of the front cover 2 and the back cover 3, entry of water droplets into the camera is prevented by the watertight rubber packing 6.

(D) When water droplets are applied onto the section between the back cover 3 and the rear lid 4, entry of water droplets into the camera is prevented by a light shielding rubber packing 5.

(E) When water droplets are applied onto the vent holes 4a, entry of water droplets into the camera is prevented by the sheet-like member 7 due to the water repellency thereof.

Even if the camera of the present invention is used in a state in which a small amount of water droplets are applied thereto, for example, in a rainfall, a problem, such as the functions of the camera decreasing, does not occur, since entry of water droplets into the camera is prevented as described above.

Although the vent holes 4a are provided in the rear lid 4 and the sheet-like member 7 is applied on the inner surface thereof in the above-described embodiment, it goes without saying that they may be provided in positions which will not be covered by the hand of a user when the camera is held, on either the wall surface of the camera main body or that of the lens frame so that the inside of the camera is communicated with the outside thereof.

Figure 6:
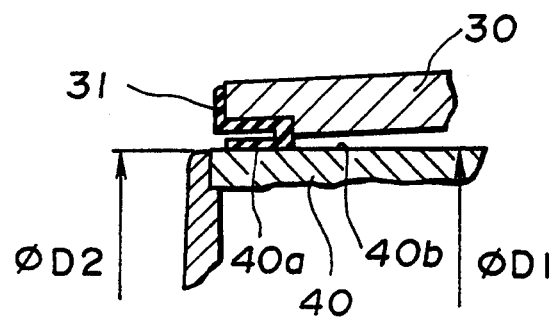
FIG. 6 is an enlarged sectional view of an essential portion of the waterdrop-proof camera illustrating a state in which the sealing member is pressed against the extreme end portion of the first lens frame.

The sealing member 31, whose base is mounted on the extreme end portion of the cam barrel 30, which is the first lens frame and which presses against the peripheral surface of the first lens frame 40, which is the second lens frame, is formed in such a manner that the cross section thereof is in the shape of a sideways U. If the outer diameter of the first lens frame 40 is denoted as $\phi D1$, in the present invention, the outer diameter $\phi D2$ of the extreme end portion 40a of the first lens frame 40 satisfies the following relation: $\phi D2 > \phi D1$, as shown in FIG. 6. That is, the extreme end portion 40a of the first lens frame 40 is formed to a large outer diameter $\phi D2$ along an inclined surface 40b from about the middle portion of the first lens frame 40.

Figure 7:
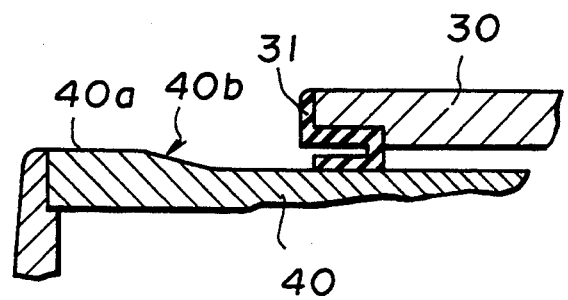
FIG. 7 is an enlarged sectional view of an essential portion of the waterdrop-proof camera illustrating a state in which the sealing member is pressed against the middle portion of the first lens frame.

With this arrangement, the amount that the sealing member 31 interposed between the two lens frames presses increases at a specific focal distance or in a stored state, for example, when stored in a collapsible barrel. That is, as shown in FIG. 7, since the outer diameter $\phi D1$ of the first lens frame 40 against which the sealing member 31 is pressed is not changed during the time when the first lens frame 40 is moved from the wide-angle position to the telephoto position, the pressing force of the sealing member 31 does not change, thus the zooming operation can be performed smoothly. However, when the lens frame is moved to a collapsible mount state, as shown in FIG. 6, the sealing member 31 is pressed against the extreme end portion 40a whose outer diameter $\phi D2$ is large along the inclined surface 40b. As a result, the pressing force thereof increases, enhancing water-proofness.

The provision of means for changing the pressing amount in the above-mentioned manner enables the lens frame to increase waterproofness of the lenses more than during ordinary use. Therefore, waterproofness, for example, when a camera is carried around in a rainfall or the like without being put into a case, is increased even more. Since a camera is usually in a stored state rather than in a photographing state, waterproofness fit to the use mode can be secured.

Although the outer peripheral surface of the first lens frame 40 is pressed against the sealing member 31 in the above-described embodiment, it is a matter of course that the sealing member 31 may be fixed to the first lens frame 40, and the outer peripheral surface of the first lens frame 40 may be pressed against the inner peripheral surface of the cam barrel 30.

An arrangement in which the pressing amount increases in the above way may be formed for a collapsible mount state or for a telephoto state. With this arrangement, water-proofness in a telephoto state (a higher incidence of use) during photographing can be increased even more. In addition, even if a zooming load is increased at the telephoto end position, no particular problem is posed because the camera is not zoomed in a telephoto direction beyond that position.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. A waterdrop-proof camera, comprising:
   a lens barrel having a first lens frame and a second lens frame which are movable to obtain a focal distance or focus position during zooming or focusing;
   a sealing member, formed from an elastic body and mounted so as to be stationary to one of the two lens frames and slidable relative to the other one of the two lens frames, for waterproofing a section between the two lens frames by exerting a force radially against the other frame, which force is maintained even when the frames are moved relative to one another; and
   pressing amount changing means for increasing a pressing force that the sealing member exerts, at one of a specific focal distance and a position in which the lens barrel is stored in a collapsed position.

2. A waterdrop-proof camera according to claim 1, wherein the pressing amount changing means includes a change in one of an inner diameter of the first lens frame and an outer diameter of second lens frame of the lens barrel to increase the pressing force of the sealing member by reducing a spacing distance between adjacent surfaces of the first and second lens frames.

3. A waterdrop-proof camera according to claim 2, wherein a cross section of the sealing member is in a shape of a substantially sideways U.

4. A waterdrop-proof camera according to claim 2, wherein the first and second lens frames are substantially cylindrical in shape, one of said frames extending into a hollow interior of the other of said frames, said frames being slidable relative to one another, the sealing member having an annular shape and having an outer peripheral portion joined to a lens frame of larger size and an inner peripheral portion slidably engaging a lens frame of smaller size and having a sideways U-shaped portion extending between said inner and outer peripheral portions.

5. A waterdrop-proof camera according to claim 2, wherein the first and second lens frames are substantially cylindrical in shape, one of said frames extending into a hollow interior of the other of said frames, said frames being slidable relative to one another, the sealing member having an annular shape and having an inner peripheral portion joined to a lens frame of smaller size and an outer peripheral portion slidably engaging a lens frame of larger size and having a sideways U-shaped portion extending between said inner and outer peripheral portions.

6. A waterdrop-proof camera according to claim 1, wherein the specific focal distance is one of a telephoto and a wide-angle state.

7. A waterdrop-proof camera according to claim 1, wherein a cross section of the sealing member is in a shape of a substantially sideways U.

8. A waterdrop-proof camera, comprising:
a lens barrel having a first lens frame and a second lens frame movable between an extended and collapsed position to assume a focal distance or focus position during zooming or focusing;
a sealing member, formed from an elastic body and provided so as to be stationary relative to one of the first and second lens frames and slidable relative to the other one of the first and second lens frames, for waterproofing a section between the first and second lens frames by exerting a pressing force radially against the other one of the first and second lens frames, said force being maintained even when said frames are moved relative to one another, a cross-section of the sealing member being in a shape of a substantially sideways U;
pressing amount changing means for changing the pressing force exerted by the sealing member, said pressing amount changing means providing an increased pressing force at one of a specific focal distance and at a position in which the lens barrel is in a collapsed position, and wherein the pressing amount changing means changes one of an inner diameter of the first lens frame and an outer diameter of the second lens frame 9. A waterdrop-proof drop camera according to claim 8, wherein the specific focal distance is in one of a telephoto and a wide-angle state.

10. A waterdrop-proof camera according to claim 8, wherein the specific focal distance is in one of telephoto and wide-angle state.

11. A waterdrop-proof camera, comprising:
a lens barrel having a first lens frame and a second lens frame movable relative to each other in the direction of an optical axis, one of the lens frames being positioned outside the other lens frame, wherein a region between adjacent surfaces of the first and second lens frames is maintained in a liquid sealed state by sealing means, including an elastic member held on one of the first and second lens frames and slidably engaging the other One of the first and second lens frames, a first and second diameter of a part of the lens frame facing and slidably engaging the sealing member is changed to increase a pressing force exerted by the member and thereby to strengthen the liquid sealed state between the first and second lens frames.

12. waterdrop-proof camera according to claim 11, wherein the first and second lens frames are moved by moving means to obtain a focal distance or focus position during zooming or focusing.

13. A waterdrop-proof camera according to claim 11, wherein one of the first and second lens frames is a fixed frame and the other lens frame is a movable frame.

14. A waterdrop-proof camera according to claim 11, wherein the first and second lens frames are movable frames.

15. A waterdrop-proof camera according to claim 11, wherein a specific state of increased pressing force is exerted between the lens frame when the lens optical system is in a state in which an overall length of the lens barrel becomes one of a maximum and a minimum.

* * * * *